(12) United States Patent  
Sotgiu

(10) Patent No.: US 9,114,676 B2  
(45) Date of Patent: Aug. 25, 2015

(54) TIRE CHANGER AND METHOD OF MEASURING FORCE VARIATIONS

(75) Inventor: Paolo Sotgiu, Modena (IT)

(73) Assignee: SNAP-ON EQUIPMENT SRL A UNICO SOCIO, Correggio (IT)

( * ) Notice: Subject to any disclaimer, the term of this patent is extended or adjusted under 35 U.S.C. 154(b) by 292 days.

(21) Appl. No.: 13/579,784

(22) PCT Filed: Dec. 1, 2010

(86) PCT No.: PCT/EP2010/007300  
§ 371 (c)(1),  
(2), (4) Date: Oct. 31, 2012

(87) PCT Pub. No.: WO2011/101006  
PCT Pub. Date: Aug. 25, 2011

(65) Prior Publication Data  
US 2013/0042980 A1  Feb. 21, 2013

(30) Foreign Application Priority Data

Feb. 17, 2010 (EP) ..................................... 10001625

(51) Int. Cl.  
*B60C 25/138* (2006.01)  
*G01M 17/02* (2006.01)  
(Continued)

(52) U.S. Cl.  
CPC .............. *B60C 25/132* (2013.01); *B60C 25/056* (2013.04); *G01M 17/021* (2013.01); *G01M 17/022* (2013.01)

(58) Field of Classification Search  
CPC ........ G01M 1/16; G01M 17/02; B60C 25/05; B60C 25/13  
USPC ........................ 157/1.17, 1.2, 1.21, 1.22, 1.24  
See application file for complete search history.

(56) References Cited

U.S. PATENT DOCUMENTS

| 4,223,386 A | 9/1980 | Maruyama et al. |
| 4,956,995 A | 9/1990 | Harrold et al. |

(Continued)

FOREIGN PATENT DOCUMENTS

| CN | 1813180 A | 8/2006 |
| CN | 101311669 A | 11/2008 |

(Continued)

OTHER PUBLICATIONS

International Search Report mailed Mar. 10, 2011 in International Application No. PCT/EP2010/007300.

(Continued)

*Primary Examiner* — David B Thomas  
(74) *Attorney, Agent, or Firm* — McDermott Will & Emery LLP

(57) ABSTRACT

A tire changer which comprises a mounting device (18) for receiving at least a wheel rim of a wheel/tire assembly, wherein the mounting device (18) has an axis (S), a roller (26) which is able to contact a peripheral surface of the wheel/tire assembly (14) and to apply a predetermined force to the peripheral surface of the wheel/tire assembly (14), a control device (32) for controlling the predetermined force applied by the during a rotation of the wheel/tire assembly about the axis (S) of the mounting device and a sensor device (30) for measuring force variations acting between the peripheral surface of the wheel/tire assembly and the roller (26), wherein supports (20, 22) of the roller (26) and of the mounting device (18) are designed for a relative movement of the roller (26) and of the mounting device (18) towards each other along a straight line to apply the predetermined force to the peripheral surface of the wheel/tire assembly (14).

5 Claims, 5 Drawing Sheets

(51) Int. Cl.
B60C 25/132 (2006.01)
B60C 25/05 (2006.01)

(56) References Cited

U.S. PATENT DOCUMENTS

| | | | |
|---|---|---|---|
| 6,457,249 B1 | 10/2002 | Corghi | |
| 6,523,409 B2 | 2/2003 | Brudis et al. | |
| 6,539,789 B1 * | 4/2003 | Kostka et al. | 73/146 |
| 6,546,635 B1 * | 4/2003 | Gerdes | 33/203.13 |
| 6,619,362 B2 * | 9/2003 | Corghi | 157/1.24 |
| 7,614,292 B2 * | 11/2009 | Kouyama | 73/146 |
| 8,186,215 B2 * | 5/2012 | Douglas et al. | 73/460 |
| 8,250,915 B1 * | 8/2012 | Voeller et al. | 73/460 |
| 8,307,874 B1 * | 11/2012 | Hanneken et al. | 157/19 |
| 8,712,720 B2 * | 4/2014 | Nicholson et al. | 702/145 |
| 2009/0266494 A1 * | 10/2009 | Sotgiu | 157/1.24 |
| 2009/0301192 A1 | 12/2009 | Douglas et al. | |
| 2011/0174446 A1 * | 7/2011 | Braghiroli et al. | 157/1.24 |
| 2011/0246128 A1 * | 10/2011 | Nicholson et al. | 702/145 |

FOREIGN PATENT DOCUMENTS

| | | |
|---|---|---|
| DE | 12 81 720 B | 10/1968 |
| EP | 0 671 621 A2 | 9/1995 |
| EP | 0 897 107 A2 | 2/1999 |
| EP | 1 054 247 A2 | 11/2000 |
| EP | 1157860 A2 | 11/2001 |
| EP | 2110270 A1 | 10/2009 |
| WO | 2005019791 A1 | 3/2005 |

OTHER PUBLICATIONS

Extended European Search Report in European Application No. 13164736.4 dated Aug. 6, 2013.
English translation of Notification of the First Office Action issued in Chinese Application No. 201080064138.8 dated Aug. 1, 2014.

* cited by examiner

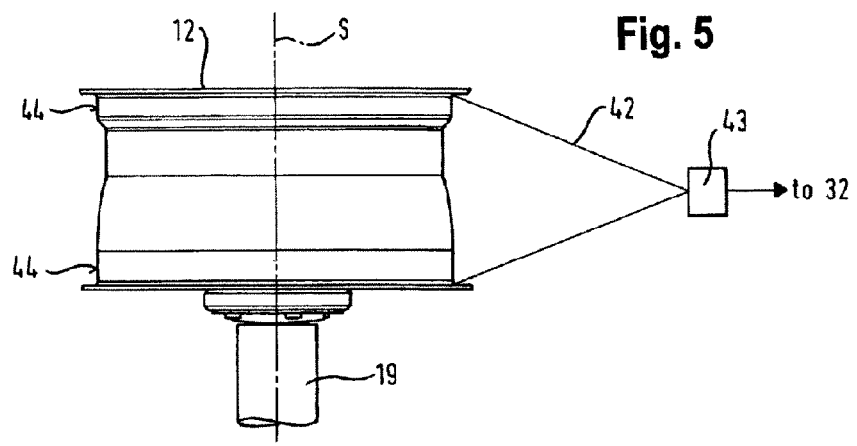
Fig. 5
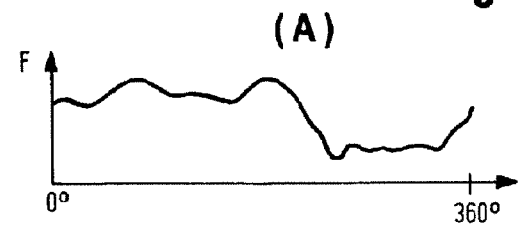
Fig. 6
(A)
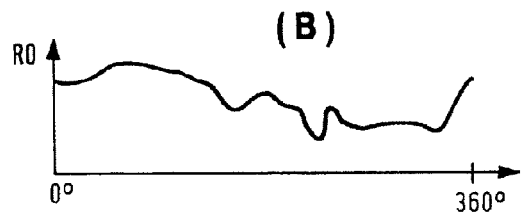
(B)
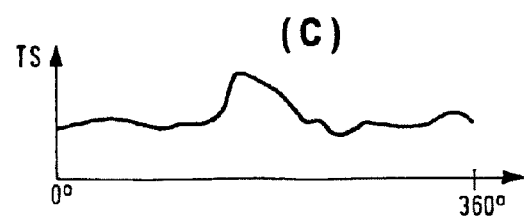
(C)

TIRE CHANGER AND METHOD OF MEASURING FORCE VARIATIONS

TECHNICAL FIELD

The disclosure concerns a tyre changer and a method of measuring force variations acting between a peripheral surface of a wheel/tyre assembly and a roller.

BACKGROUND

A tyre changer and a method for fitting a tyre onto a rim of a vehicle wheel and/or for removing a tyre from a rim of a vehicle wheel is already known from EP 2 110 270 A1. Such a tyre changer comprises at least one fitting and/or removal tool being movably attached to a pillar. The at least one fitting and/or removal tool can be aligned in such a way that a tyre can be fitted onto a tyre or removed from a tyre without damaging the rim.

It is further known from US 2009/0301192 A1 to provide a wheel assembly service system, especially a wheel balancer with a roller which is moved by a pivotal movement towards the tread surface of the tyre to apply a controlled force to the tyre. The radial and/or axial force variations can be detected and thereby a tyre non-uniformity can be determined.

SUMMARY

The disclosure provides a tyre changer that is able to detect a non-uniformity and/or a uniformity of a wheel/tyre assembly. Furthermore, the disclosure provides a method of detecting tyre non-uniformity and/or uniformity using a tyre changer.

This is achieved with a tyre changer comprising a mounting device for receiving a wheel/tyre assembly to rotate about an axis. A load roller is able to contact a peripheral surface of the wheel/tyre assembly to apply a force to the peripheral surface. A control device controls a predetermined force applied by the roller to the peripheral surface. A sensor device measures force variations acting between the peripheral surface of the wheel/tyre assembly and the roller. The force variations are measured particularly along a straight line between the axis of the mounting device and the roller axis. According to the disclosure, a tyre changer, that means an apparatus which can fit a tyre onto a rim or remove a tyre from a rim, is able to detect force variations between the load roller and the peripheral surface of the wheel/tyre assembly. These detected force variations correspond to non-uniformity of the wheel/tyre assembly and particularly of the tyre. With the inventive tyre changer, force variations are detected which act between the peripheral surface of the wheel/tyre assembly, in particular the tread surface of the tyre, and the roller. For this purpose, the roller is pushed along a straight line with a predetermined force towards the wheel/tyre assembly or the wheel/tyre assembly is pushed towards the roller. The measured force variations are analyzed and the corresponding non-uniformity detected. Non-uniformity should be avoided as it causes oscillations on the front and rear axles of a vehicle which leads to a tumbling motion of the wheel and to vibrations acting on the steering wheel. Non-uniformity of a wheel/tyre assembly negatively influences the running characteristics of the vehicle and causes a poor running performance. The control device may comprise limit values of uniformity parameters predetermined by the vehicle manufacturer. If the measured values exceeds these limit values the wheel/tyre assembly is treated or sorted out.

The predetermined force or load can be applied by a relative translational movement between the load roller and the wheel/tyre assembly without any momentum acting onto the peripheral surface of the tyre.

At least one of the support means for supporting the mounting device and the roller is designed for a relative movement of the mounting device and the roller towards each other along a straight line to apply the predefined force to the peripheral surface of the tyre. The mounting device and the roller can be moved simultaneously or each separately.

According to an embodiment, the roller is height adjustably mounted on a vertical support, for instance on a pillar. Therefore, the roller can be adapted to the vertical position and to the section width of the wheel/tyre assembly and positioned in such a way that the wheel/tyre assembly is aligned with the roller, particularly lies centrally to the roller. According to another embodiment, the roller is positioned in a fixed height level. The axial length of the roller is greater than the width of the current wheel/tyre assemblies so that the current wheel/tyre assemblies can be checked.

The mounting device can be moved along a straight line towards the roller to allow an engagement of the peripheral surface of the wheel/tyre assembly and of the roller. Especially, the mounting device is displaceable towards the support frame on which the roller is mounted. For the displacement of the mounting device, a linear drive, especially an electro mechanic drive or hydraulic/pneumatic piston-/cylinder drive is provided. The mounting device is able to take several positions being differently spaced from the roller such that the respective peripheral surface of wheel/tyre assembly with different sizes can be positioned in such a way that it engages the roller.

Alternatively, the roller can be moved along a straight line towards the mounting device to allow an engagement of the peripheral surface of the wheel/tyre assembly and the roller. The roller can be driven by an electro mechanic drive or hydraulic/pneumatic piston-/cylinder drive. The roller is able to take several positions being differently spaced from the wheel/tyre assembly such that the respective peripheral surface of wheel/tyre assembly with different sizes can be positioned in such a way that it engages the roller.

Preferably, a rotary drive, especially an electric motor, is provided for rotating the wheel/tyre assembly about the axis. To detect uniformity of the tyre, the whole circumferential peripheral surface of the tyre is to be "scrolled". Such a drive is used also for fitting a tyre onto a rim and/or removing a tyre from a rim.

Alternatively, a second drive, especially an electric motor can be provided for driving the roller. Alternatively, only one drive is provided driving the roller and the wheel/tyre assembly for the measurement of the force variations. The load roller driven by a second drive decreases the friction between the peripheral surface of the wheel/tyre assembly and the roller during the uniformity measurement.

In particular, the roller is mounted in such a way that at least the radial force variations acting between the peripheral surface of the wheel/tyre assembly and the roller are measured. The radial forces are the forces acting substantially perpendicularly to the axis of the tyre. Additionally, the axial or lateral forces can be measured, that means the forces acting substantially in the direction of the axis of the tyre. The force variations can be measured by a sensor device which is linked to the roller or to the mounting device to which the wheel/tyre assembly is fixed.

The sensor device can comprise a strain gauge, a piezoelectric sensor and/or a Hall sensor to measure the axial and/or radial forces. Any known sensor can be used being able to detect lateral and/or radial forces.

In particular, the peripheral surface of the wheel/tyre assembly is the tread surface of the tyre. According to the preferred embodiment, a rim with a tyre which can be used as a vehicle wheel is fixed to the mounting device and the wheel is positioned in such a way relative to the roller that the tread surface engages the load roller. Afterwards, the wheel is rotated and the force variations between the tread surface and the roller are measured for detecting a non-uniformity of the wheel/tyre assembly.

Furthermore, the disclosure relates to a method of measuring force variations acting between a peripheral surface of a wheel/tyre assembly and the roller, in which the wheel/tyre assembly is mounted on a mounting device of a tyre changer. The mounting device has an axis and the wheel/tyre assembly is rotated about the axis, wherein the load roller applies a predetermined force to a peripheral surface of the wheel/tyre assembly. A control device controls the predetermined force applied by the roller to the peripheral surface of the wheel/tyre assemble and the sensor device measures force variations acting between the peripheral surface and the roller. In order to apply the predetermined force to the peripheral surface of the tyre a relative movement of the roller and of the mounting device towards each other along a straight line is carried out. With respect to the advantages it is referred to the above mentioned explanations.

In particular, the radial and/or axial force variations are measured by the sensor device which is in force locking connection with the shaft of the mounting device or with the roller.

Preferably, signals corresponding to the force variations are sent by the sensor device to the control device. The control device includes analyzing components which analyze the signals and evaluates the uniformity or non-uniformity of the wheel/tyre assembly.

According to the preferred embodiment, the mounting device is horizontally moved and the roller is vertically moved in a position, in which the roller engages the peripheral surface of the wheel/tyre surface. Alternatively, the roller is vertically and horizontally moved in a position, in which it engages the peripheral surface of the wheel/tyre assembly. According to another embodiment, both the roller and the mounting device are moved simultaneously towards each other.

The mounting device and/or the roller can be driven by a linear drive, especially by an electro mechanic drive to apply the predetermined force onto the peripheral surface of the wheel/tyre assembly. Independently from the type of drive for the mounting device, the drive, in particular the linear drive can include locking, especially self-locking mechanical means which generate the relative movement between the mounting device and the roller and are connected rigidly to the mounting device and the roller. The locking means can be designed to lock the axis of the mounting device and the axis of the roller to a constant distance therebetween.

The sensor device can include a load cell or is designed as load cell providing an electric signal which is proportional to the force acting between the peripheral surface of the wheel/tyre assembly and the roller. The load cell can be provided with a force feeling element which is linked by force locking to the roller or to the mounting device, wherein the physical effect created at the force feeling element is transformed into an electric signal. Appropriate loads cells can include strain gauges, piezoelectric elements, Hall elements and/or magneto-elastic elements.

The sensor device can be connected to or can include calibration means designed to determine absolute values of the forces acting between the peripheral surface of the wheel/tyre assembly and the roller. These force values are proportional to the tyre stiffness.

The tyre changer can be provided with a scanning device designed to scan the lateral runout of one tyre side wall or both tyre side walls, particularly at the angular position of the roller.

The lateral runout is measured preferably while the roller engages the peripheral surface of the wheel/tyre assembly. The lateral runout of the tyre can be measured also while the roller is out of engagement which the tyre. Further, the lateral runout can be measured with different inflation pressures of the tyre under loaded condition or under unloaded condition. The measured runout values can be used to determine the tyre stiffness.

The tyre changer can be provided with scanning devices to determine the radial rim runout and to determine the radial runout of the wheel/tyre assembly. The measurement of the radial runout of the wheel/tyre assembly can be performed under loaded condition and under unloaded condition. Further, the tyre changer can be provided with an angular measuring device to determine the angular position of the wheel/tyre assembly during its rotation, especially during the measurement of the force variations and of the several runout measurements. Additionally, the tyre changer can be provided with matching means to remount the tyre on the rim. During the matching operation, high values of the force variations and low values of the radial rim runout along the periphery of the wheel/tyre assembly are brought into angular positions in which vibrations caused by non-uniformities of the tyre and of the wheel rim are minimized.

At least one measured value of the force measurement and/or of the runout measurement can be compared with a respective predetermined force value or runout value for quality check.

BRIEF DESCRIPTION OF THE DRAWINGS

The disclosure is described in further detail hereinafter with reference to the Figures in which:

FIG. 5 shows the scanning of the peripheral surface of a wheel rim, and FIG. 6 shows diagrams for the illustration of a method for determining the tyre-stiffness.

DETAILED DESCRIPTION

Figure 1:
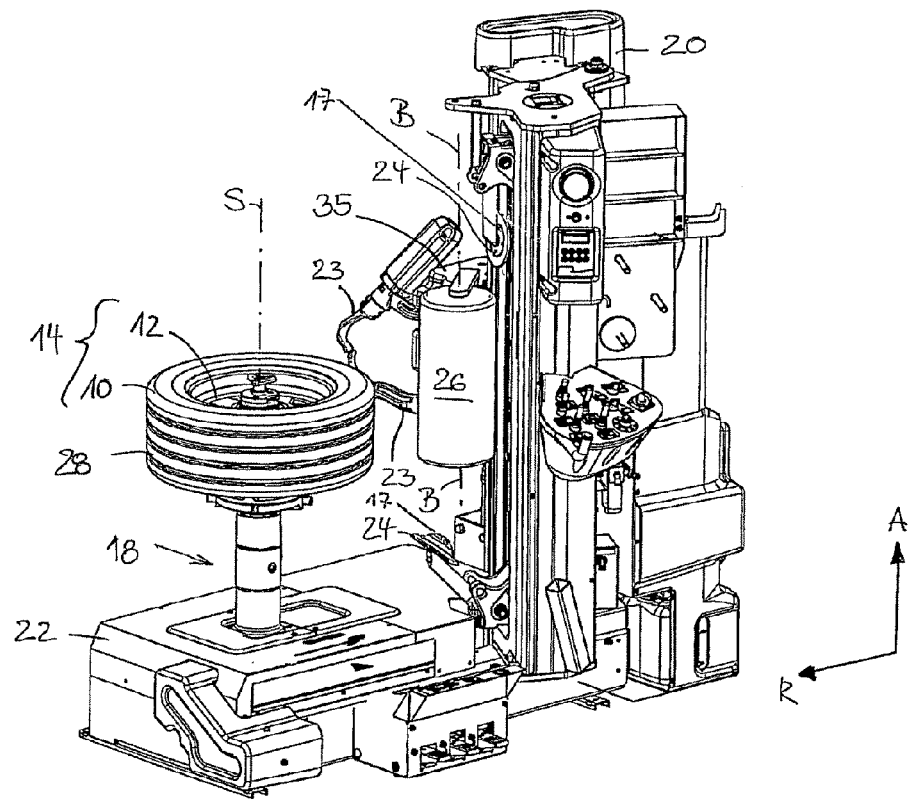
FIG. 1 shows tyre changer according to the disclosure with a wheel/tyre assembly and a roller in a position in which the peripheral surface of the wheel/tyre assembly does not engage the roller.
Figure 2:
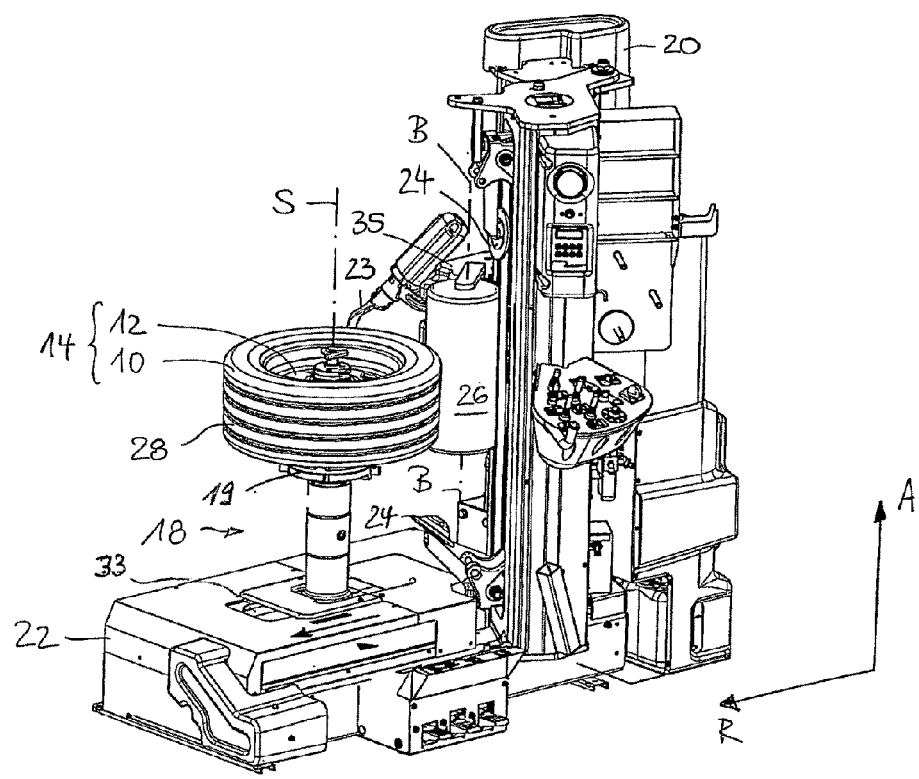
FIG. 2 shows the tyre changer of FIG. 1 with the peripheral surface of the wheel/tyre assembly engaging the roller, FIG. 3 schematically shows a sensor device and a control device of the apparatus of FIGS. 1 and 2.
Figure 4:
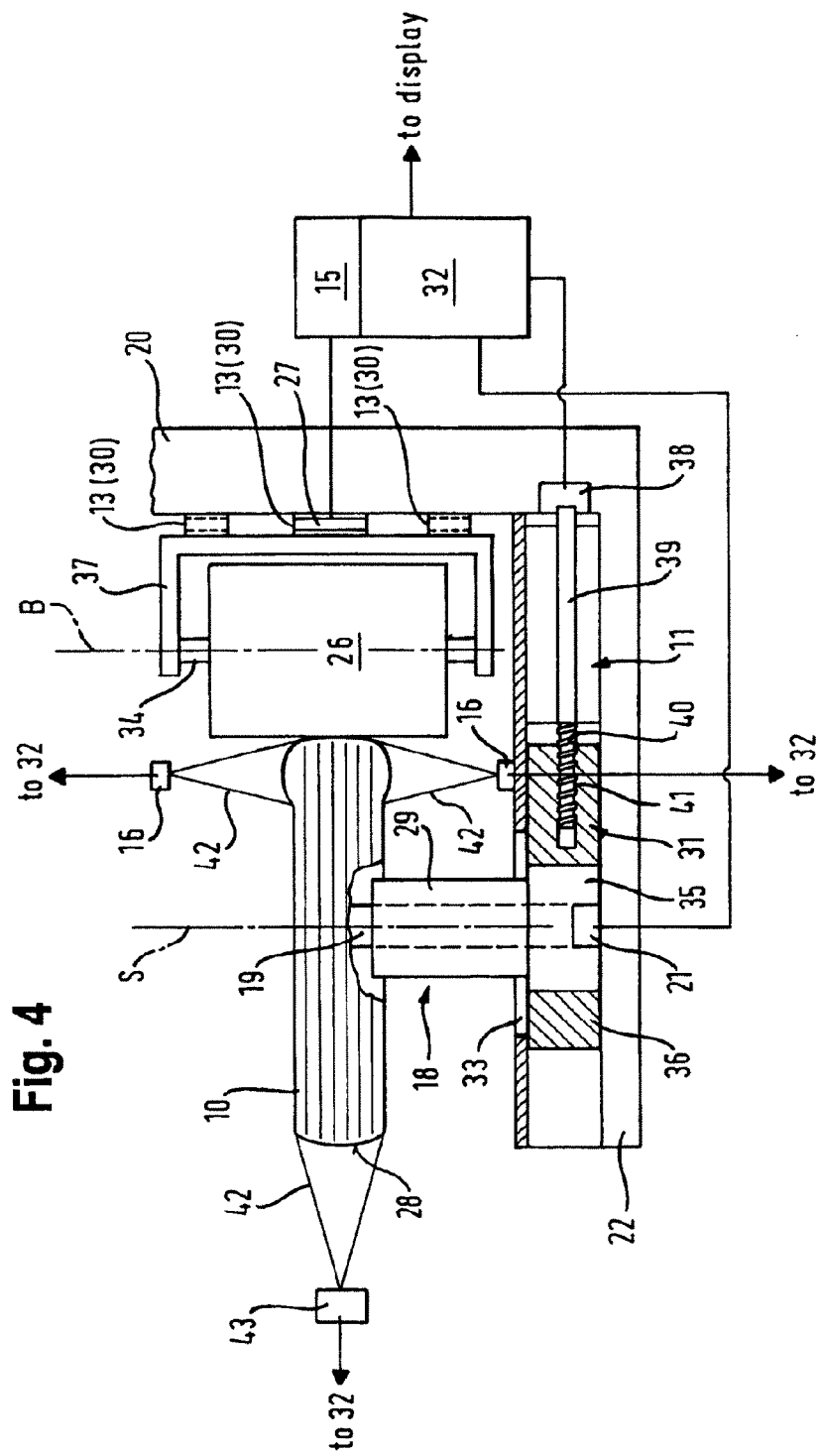
FIG. 4 shows the positions of the wheel/tyre assembly and of the load roller in their engaging position.

In FIGS. 1, 2 and 4 a tyre changer is shown, that means an apparatus for fitting a tyre 10 onto a wheel rim 12 of a vehicle wheel which constitutes an embodiment of a wheel/tyre assembly 14 or for removing a tyre 10 from a wheel rim 12 of the wheel/tyre assembly.

The tyre changer comprises a wheel mounting device 18 which has a shaft 19 to which the wheel rim 12 is fixed. The wheel mounting device 18 has an axis S and being rotatable about the axis S by means of a rotary drive 35 which can be in the form of an electric motor. The wheel rim 12 is non-rotatably connected to the shaft 19 of the mounting device 18 in particular with clamping means and is fixed in such a way that it is centered to the shaft 19. The mounting device 18 is movable towards a support 20 which carries mounting/de-mounting tools and a load roller 26 (see arrow in FIGS. 1 and 2). The support 20 is designed as a vertical pillar of the tyre changer.

Thereby, the mounting device 18 can be fixed in several positions being differently spaced from the support 20. The support 20 extends substantially parallel to the axis (S) of the mounting device 18. The mounting device 18 is supported and guided on a support 22 or base frame for a linear movement, particularly in horizontal direction. The supports 20 and 22 are rigidly connected together. The mounting device 18 can be stationary locked in its position by locking means 31 (FIG. 4) during the measurement. The mounting device 18 includes the rotary drive 35, the shaft 19 and a shaft support 29 which is rigidly connected to a sliding carriage 36 which is guided for a linear movement in the support 22.

At least one fitting and/or removal tool is height-adjustably attached to the support 20. FIGS. 1 and 2 show various types of fitting or removal tools, namely a hook-shaped tool 23 and two bead releasing tools 24. The bead releasing tools 24 can be moved towards each other in parallel relationship with the axis S of the mounting device 18 and—as the wheel is centered positioned to the shaft 19—of the wheel when pressing tyre beads off the rim flanges. The mounting and demounting operations are performed while the wheel/tyre assembly is released from the load roller 26 (FIG. 1).

Furthermore, the roller 26 is preferably in fixed position attached to the support 20 and can be aligned with, especially can be centrally positioned to an opposite wheel/tyre assembly 14 and being adaptable to different widths of wheel/tyre assemblies. The roller 26 can rotate about its axis B. The roller 26 can be arranged in height-adjustable manner in another embodiment.

Figure 3:
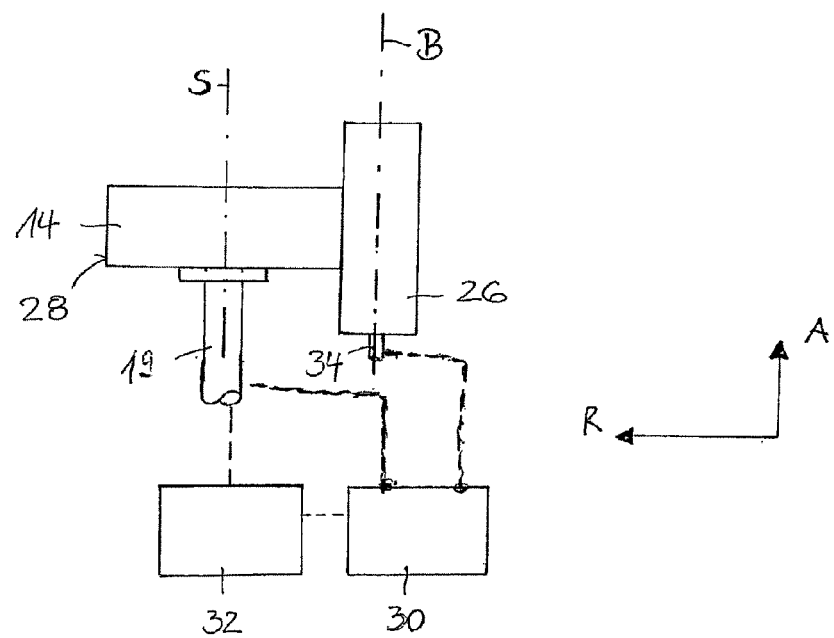

In FIG. 1, the mounting device 18 is shown in the position, in which a peripheral surface of the wheel/tyre assemble, in particular the tread surface 28, does not engage the roller 26. FIG. 2 shows the position, in which the tread surface 28 engages the roller 26. The mounting device 18 can be pushed with a predefined force towards the roller 26 during a linear movement. A control device 32 being connected to the mounting device 18 and controls the applied predetermined force (see FIGS. 3 and 4). The predetermined force is transmitted directly to the peripheral surface without any momentum. Furthermore, the control device 32 is connected to a sensor device 30. The sensor device 30 is able to measure force variations acting between the tread surface 28 and the roller 26. In particular, the sensor device 30 is able to measure axial or lateral forces (see arrow A in FIGS. 1, 2) and/or radial forces (see arrow R in FIGS. 1, 2). Corresponding signals were sent to the control device 32. Depending on detected axial and radial force variations, non-uniformity or uniformity of the tread surface 28 and of the tyre can be determined.

The operation of the tyre changer is as follows. The wheel/tyre assembly 14 is centrally mounted on and fixed to the mounting device 18. Afterwards, the mounting device 18 is driven towards the support 20 as far as the tread surface 28 engages the roller 26. By means of the locking means, the mounting device 18 is stationary locked in its position during the measurement of the force variations. A predetermined force is acting between the roller 26 and the tread surface 28. The control device 32 controls the predetermined force. Then, the wheel/tyre assembly 14 is rotated by the mounting device 18 and the circumferential surface is "scrolled" by the roller 26. Thereby, force variations or forces acting between the tread surface 28 and the roller 26 are measured. In particular, the sensor device 30 measures the radial and/or lateral forces and sending corresponding signals to the control device 32 (see arrows R and A in FIGS. 1, 2). Depending on the lateral and radial force variations, non-uniformity or uniformity of the tread surface 28 and of the tyre can be determined by analyzing components of the control device 32.

For example a strain gauge can be part of the sensor device 30. The strain gauge is in force locking connection with a shaft 34 of the roller 26 or the shaft 19 of the mounting device 18 (see FIG. 3). Expansions and/or compressions of a force feeling element 27 of the sensor device 30 caused by the forces in the radial and/or axial (lateral) direction (see arrows R and A in FIG. 3), influence the resistance of the strain gauge which can be detected as an electric signal and measured. Piezoelectric devices or Hall sensors or other force measuring devices can be used to measure the forces and force variations.

The roller 26 can be mounted directly to the support 20 or to a tool carrier 35.

Alternatively, the mounting device 18 can be fixedly attached and unmovable to the support frame 22 and the roller 26 can be moved by a linear drive in such a way that it is able to engage the tread surface of the tyre to apply a predetermined force to the tread surface of the wheel/tyre assembly. In its position, in which the roller 26 engages the tread surface, the roller 26 can be stationary locked during the measurement of the force variations by locking means, as will be explained in detail below.

Locking means may be provided between the roller 26 or the tool carrier 35 and the support 20. The mounting device 18 can be locked by known locking means which are used for locking the mounting means 18 on the support 22 during the tire mounting/demounting operation. Alternatively, locking means which are supported on the support 22 and support 20 can act between the mounting device 18 and the roller 26, as will be explained in connection with FIG. 4.

FIG. 4 shows details of the force measuring equipment which can be arranged on a tyre changer, for instance on a tyre changer according to the FIGS. 1 and 2.

According to FIG. 4, the roller 26 is supported by means of a support frame 37 in a predetermined height level at the vertically extended support 20. The support frame 37 is rigidly connected to the support 20, wherein the sensor device 30 which includes a load cell 13 or which is designed as a load cell is arranged between the support frame 37 and the support 20. The load cell 13 includes a force feeling element 27 which is attached or rigidly connected on one side to the vertical support 20 and on the other side to the support frame 37. The forces acting between the tyre 10 and the roller 26 influence the physical behavior of the force feeling element, while the distance between the axis S of the mounting device 18 and of the wheel/tyre assembly 14 and the axis B of the roller 26 is kept constant during the force measurement. The wheel/tyre assembly 14 is loaded by the roller 26 and rotates about its axis which is coaxial with the axis S of the mounting device 18. By means of such a measuring assembly, the spring forces of the tyre 10 are measured directly by the load cell 13, because the distance between the axis S of the mounting device 18 and of the wheel/tyre assembly 14 and the axis B of the roller 26 is kept constant during the force measurement. The measuring assembly of the disclosure provides values of the spring forces of the tyre on each angular position around the periphery of the tyre. The measured spring force follows the equation:

$$F_s = F_m - F_l$$

wherein $F_s$=spring force of the tyre
$F_m$=measured force
$F_l$=constant force applied by the roller onto the surface of the tyre The value of the spring force of the tyre is proportional to the tyre stiffness. The force measuring equipment can include one load cell 13 or one sensor device 30, as shown in FIG. 4, or more load cells or sensor devices, especially two load cells 13/sensor devices 30 between the support frame 37 and the support 20, as shown in broken lines in FIG. 4. The load cell 13/sensor device 30 may be arranged also between the roller shaft 34 and the support frame 37 or at another appropriate place within the arrangement which rigidly connects the shaft 19 of the mounting device 18 and the shaft 34 of the roller 26, for instance between the shaft 19 and a shaft support 29 or the sliding carriage 36.

The feeling element 27 may be an deformable body provided with strain gauges whose electrical resistance is changed by a body deformation which can be bending, elongation, compression etc. The force feeling element 27 can be a magneto-elastic body whose deformation creates changes of electrical inductivity. Further, the force feeling element 27 can be a piezo-quartz crystal or a Hall-element by means of which forces acting on it are transformed into an electrical voltage.

Thus, the load cell 13 or the sensor device 30 is able to provide an electrical signal which is directly proportional to the forces acting between the roller 26 and the tyre 10.

The sensor device 30 or the load cell 13 can be connected to calibration means 15 designed to determine an absolute value of the force acting between the peripheral surface 28 of the wheel/tyre assembly 14 and the roller 26. In the embodiment of the FIG. 4, the calibration means 15 are integrated into the electronical equipment of the control device 32, but the calibration means 15 can be incorporated in the sensor device 30 or the load cell 13.

The support 20 of the roller 26 and a sliding carriage 36 of the mounting device 18 are configured to move the roller 26 and the mounting device 18 along the straight line extending between the axis S of the mounting device 18 and the roller axis B about which the roller 26 is rotatable. In the embodiment of the FIG. 4, the mounting device 18 is driven by a linear drive 11, especially by an electro mechanic drive to apply the predetermined force onto the tread surface 28 of the wheel/tyre assembly 14.

The linear drive 11 includes self-locking mechanical means 31 which transmit the rotary movement of a motor 38 to the mounting device 18. The self-locking mechanism 31 includes a threaded spindle 39 which is rotary driven by the motor 38. A thread 40 of the spindle 39 engages into an internal thread 41 of the sliding carriage 36. During the rotation of the spindle 39, the mounting device 18 and the wheel/tyre assembly 14 are moved along a slotted hole in the support 22 to the roller 26 or away from the roller 26. For the force measurement, the tyre 10 is pressed against the roller 26, as shown in FIG. 4, and the self-locking means 31 lock the axis S of the mounting device 18 and the axis B of the roller 26 to a constant distance therebetween. Instead of the self-locking means 31 provided by the thread 40 of the spindle 39 and the internal thread 41 of the sliding carriage 36, other locking means, for instance bolts or the like can be used.

The tyre changer can be provided with a scanning device 16 designed to scan the lateral runout of at least one tyre side wall, particularly at the angular position of the roller 26 in a condition in which the wheel/tyre assembly 14 is loaded by the roller 26, as shown in the FIG. 4 or in which the tyre 10 is in a removed position from the roller 26, as shown in the FIG. 2. An appropriate contact-less scanning device is described in U.S. Pat. No. 7,738,120 B2 in form of a sheet of light imaging system based on the principle of optical laser triangulation. The optical scanning device can have a light source that emits a light beam in a planar light beam 42 shaped in a sheet of light or a planar light beam onto the wheel surface, in particular the side wall of the tyre and intersects the side wall surface in a plurality of impingement points along a stripe-shaped impingement area. At each of the impingement point, the light beam is scattered in a plurality of light rays that are reflected. At least a plurality of these reflected light rays will be then concentrated or focused by a lens system or input pupil into a stripe-shaped projected image area on a two-dimensional photosensitive sensor surface. The spacings and thus positions of the individual impingement points sensed at the wheel or the rim can then be determined by the triangulation method in dependence on the directions of the emitted and reflected light beams, particularly on the sensor signals. From the signals, the lateral runout of the tyre 10 on one side or on both sides can be determined. The scanning devices are connected to the control device 32 and the measured values around the periphery of the tyre 10 can be used to determine the tyre stiffness.

The tyre changer according to the shown embodiment includes an additional scanning device 43 to determine the radial runout of the wheel/tyre assembly 14, as shown in FIG. 4. The scanning device 43 can be arranged on the support 22 or on the support 20, as known from U.S. Pat. No. 7,768,632 B2. Further, the scanning device 43 can be used to determine the runout of the wheel rim 12, especially the runout of the outer peripheral surface of the wheel rim 12, as shown in FIG. 5. The scanning device 43 has the same configuration as the above explained scanning device 16. The light beam 42 of the scanning device 43 scans preferably the bead seat surfaces 44 of the wheel rim 12 to determine the radial runouts on the peripheries of these surfaces.

An angular measuring device 21 is connected to the shaft 19 of the mounting device 18 to determine the angular position of the wheel/tyre assembly during its rotation, especially during the measurement of the force variations and of its radial and lateral runouts, especially the runout of the tyre side walls. Further, the angular positions of the runouts on the outer periphery of the wheel rim 12, in particular in the peripheral bead seat surfaces 44 are determined with the angular measuring device 21 whose measuring signal is delivered to the control device 32.

The tyre changer according to the embodiment includes matching means 17 to remount in cooperation with the control device 32 the tyre 10 on the wheel rim 12 into angular positions in which high spots of the measured force variations and low spots of the measured radial rim runout, especially on the bead seat surfaces 44 of the wheel rim 12, are brought into an angular positioning to each other that at least one of the match conditions are met: resulting vibrations or resulting radial force variations or radial runouts of the wheel/tyre assembly are minimized. To achieve at least one of these conditions, the low spot of the radial rim runout, especially on the bead seat surfaces and the high spot of the force variation are brought substantially into the same angular position around the periphery of the wheel/tyre assembly 14. The matching means 17 can be designed as non-rotating clamping surfaces in the central portion of the bead release tools 24. Instead of rollers 24 as bead release tools, non-rotating bead release members or additional clamping members can be used to perform the clamping action on the tyre during the matching operation.

The matching operation is performed after the release of the tyre 10 from the peripheral surface of the load roller 26 (FIG. 1).

The bead releasing tools, for instance the bead release rollers 24 are pressed on the side walls of the tyre to release the tyre 10 on its both sides from the wheel rim, while the wheel/tyre assembly 14 is rotated by the rotary drive 35. Then, the tyre is clamped between the matching means 17 and kept in a stationary angular position. Under the control of the control device 32 the wheel rim 12 is rotated by the rotary drive 35 in the determined position in which at least one of the before explained match conditions are met.

The diameter of the load roller 26 is smaller than the diameter of the wheel/tyre assembly 14 to be tested and can have 120 mm to 180 mm. The constant load which is applied by the roller 26 onto the peripheral tyre surface is about 3 kN to 4 kN. The rotational speed during the force measurement is about 70 rpm to 100 rpm.

In order to perform the matching operation, the first harmonics of the measured force variations and of the measured rim runout are used to control the rotation of the shaft 19 with respect to the tyre which is stationary fixed by the matching means 17. In order to get additional information of the tyre quality, higher harmonics can be determined during the force measurement.

FIG. 6 illustrates a method for determining the tyre-stiffness around the tyre-periphery through 360° about the axis S which corresponds to the axis of the tyre. The diagram (A) shows the radial force variation F of the wheel/tyre assembly 14 through 360° about the axis S. The diagram (B) shows the radial runout RO of the rim, especially of the bead seat surfaces resulting from a measurement according to FIG. 5. The starting point (angular position 0°) of the measurement is provided by an index mark on the wheel rim 12.

The diagram (C) shows the tyre-stiffness TS within 360° about the axis S which is identical with the tyre axis. The diagram (C) is obtained by subtracting the diagrams (A) and (B) from each other, in particular by subtracting the diagram (B) from the diagram (A). The subtracting operation can be conducted by a computing section of the control device 32.

The matching operation can be controlled also in that the determined tyre-stiffness and the runout of the rim are used to rotate the tyre on the wheel rim a respective angular position for minimizing/rotating vibrations or force variation of the wheel/tyre assembly. For instance, a low spot of the runout of the wheel rim and a high spot of the tyre stiffness are brought in a match position.

LIST OF REFERENCES 10 tyre
11 linear drive
12 wheel rim
13 load cell
14 wheel/tyre assembly (vehicle wheel)
15 calibration means
16 scanning device
17 matching device
18 mounting device
19 shaft of the mounting device
20 support (pillar) of the roller
21 angular measuring device
22 support of the mounting device
23 mounting/demounting tool
24 bead releasing tools
25 tool carrier
26 load roller
27 force feeling element
28 peripheral surface (thread surface) of the wheel/tyre assembly
29 shaft support
30 sensor device
31 self-locking mechanical means
32 control device
33 slotted hole
34 roller shaft
35 rotary drive
36 sliding carriage
37 support frame
38 motor (electric motor)
39 threaded spindle
40 motor, electric motor
41 internal thread
42 planar light beam
43 scanning device
44 bead seat surfaces

The invention claimed is:

1. A tyre changer, comprising:
a mounting device for receiving at least a wheel rim of a wheel/tyre assembly, the mounting device having an axis,
a roller being able to contact a peripheral surface of the wheel/tyre assembly and to apply a predetermined force to the peripheral surface of the wheel/tyre assembly,
a control device for controlling the predetermined force applied by the roller during a rotation of the wheel/tyre assembly about the axis of the mounting device and
a sensor device for measuring force variations acting between the peripheral surface of the wheel/tyre assembly and the roller,
wherein supports of the roller and of the mounting device are designed for a relative movement of the roller and of the mounting device towards each other along a straight line to apply the predetermined force to the peripheral surface of the wheel/tyre assembly,
wherein the mounting device and/or the roller are driven by a linear drive, especially by an electro mechanic drive to apply the predetermined force onto the peripheral surface of the wheel/tyre assembly, and
wherein the linear drive includes self-locking mechanical means transmitting movement and connected rigidly to the mounting device and the roller to establish the locking means.

2. A tyre changer, comprising:
a mounting device for receiving at least a wheel rim of a wheel/tyre assembly, the mounting device having an axis,
a roller being able to contact a peripheral surface of the wheel/tyre assembly and to apply a predetermined force to the peripheral surface of the wheel/tyre assembly,
a control device for controlling the predetermined force applied by the roller during a rotation of the wheel/tyre assembly about the axis of the mounting device and
a sensor device for measuring force variations acting between the peripheral surface of the wheel/tyre assembly and the roller,
wherein supports of the roller and of the mounting device are designed for a relative movement of the roller and of the mounting device towards each other along a straight line to apply the predetermined force to the peripheral surface of the wheel/tyre assembly, and
wherein the sensor device is connected to or includes calibration means designed to determine an absolute value of the force acting between the peripheral surface of the wheel/tyre assembly and the roller.

3. A method of measuring force variations acting between a peripheral surface of a wheel/tyre assembly and a roller, in which the wheel/tyre assembly is mounted on a mounting device of a tyre changer, the mounting device having an axis, wherein the roller and the wheel/tyre assembly are moved relatively towards each other along a straight line to apply a controlled predetermined force to a peripheral surface of the wheel/tyre assembly and force variations acting between the peripheral surface and the roller are measured, while the wheel/tyre assembly is rotated about the axis,
    wherein an electrical signal which is proportional to the measured force variations is produced and calibrated to determine absolute values of the measured forces.

4. A method of measuring force variations acting between a peripheral surface of a wheel/tyre assembly and a roller, in which the wheel/tyre assembly is mounted on a mounting device of a tyre changer, the mounting device having an axis wherein the roller and the wheel/tyre assembly are moved relatively towards each other along a straight line to apply a controlled predetermined force to a peripheral surface of the wheel/tyre assembly and force variations acting between the peripheral surface and the roller are measured, while the wheel/tyre assembly is rotated about the axis,
    wherein the lateral runout of at least one tyre side wall is determined, and
    wherein the lateral runout is measured with different inflation pressures of the tyre.

5. A method according to claim 4,
    wherein the lateral runout is measured each at an angular position at which the roller engages the peripheral surface of the wheel/tyre assembly.

\* \* \* \* \*